Feb. 23, 1954 S. OLDBERG ET AL 2,670,022
SELF-LOCKING ADJUSTMENT SCREW
Filed Jan. 25, 1947 2 Sheets-Sheet 2
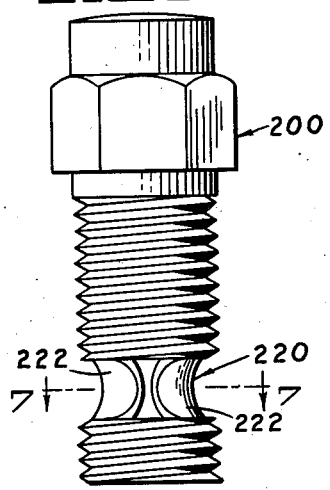
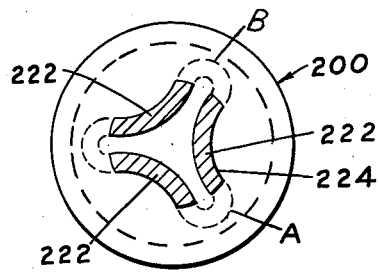
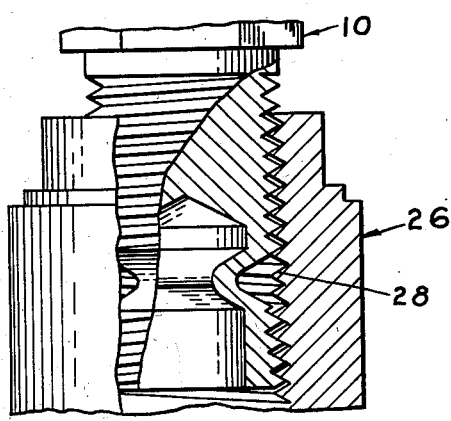
INVENTOR.
SIDNEY OLDBERG
MICHAEL C. TURKISH
BY
ATTORNEYS Patented Feb. 23, 1954

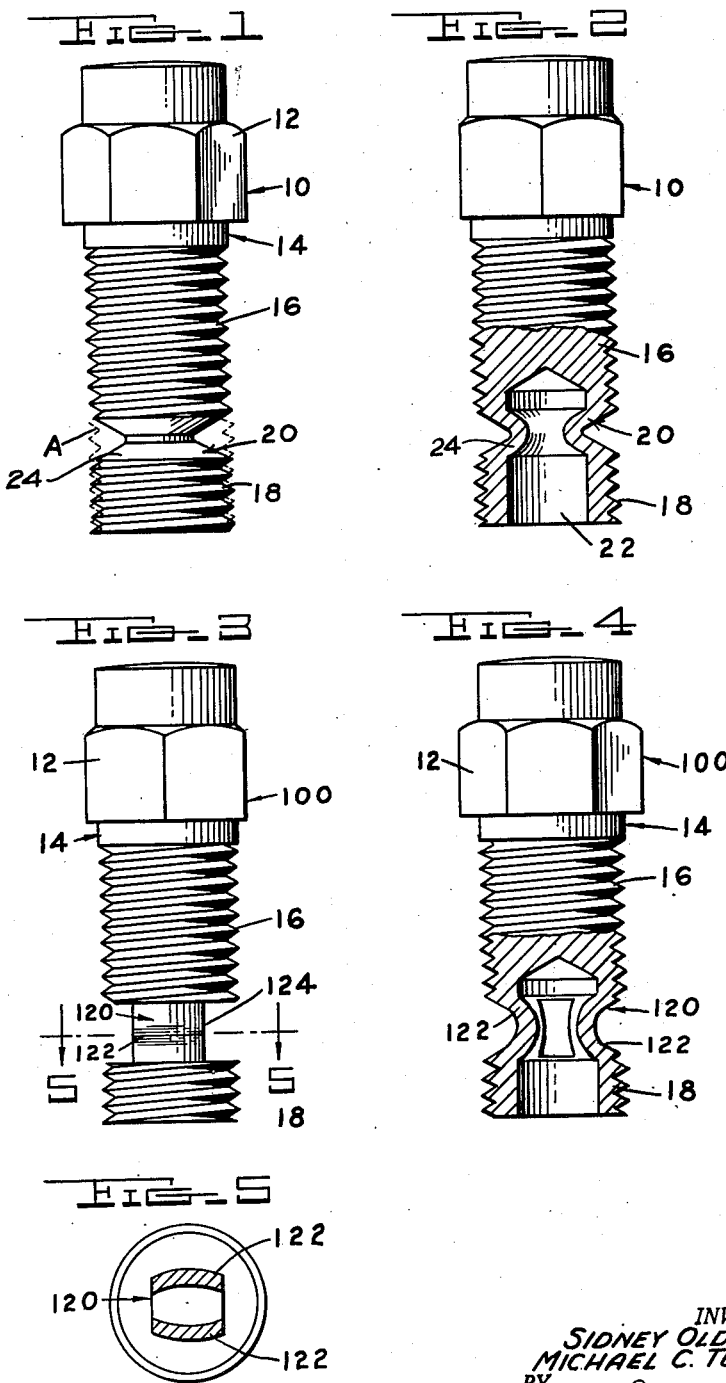

2,670,022

UNITED STATES PATENT OFFICE 2,670,022

SELF-LOCKING ADJUSTMENT SCREW

Sidney Oldberg, Birmingham, and Michael C. Turkish, Detroit, Mich., assignors to Eaton Manufacturing Company, Cleveland, Ohio, a corporation of Ohio Application January 25, 1947, Serial No. 724,404

7 Claims. (Cl. 151—70)

This invention relates to locking connections and more particularly to self-locking adjustment screws.

Broadly the invention comprehends the provision of self-locking screws each comprising a pair of axially spaced, equal pitch diameter, axially aligned threaded sections, the lead of the thread on one section being axially offset to the lead of the thread on the other section and a diaphragm resilient section integrally connecting the threaded sections together.

An object of the invention is the provision of self-locking adjustment screws of simple and economical construction.

Another object of the invention is the provision of self-locking adjustment screws that possess adequate torque holding and low torsional characteristics within their operating range.

A further object of the invention is the provision of self-locking adjustment screws comprising a pair of axially spaced, equal pitch diameter threaded sections, the lead of the thread of each threaded section being offset axially to one another and a resilient diaphragm integrally connecting the sections together effective to provide for an axial yielding of the screws so as to secure proper torque holding characteristics when in adjusted position with associated internally threaded members having a continuous lead.

A still further object of the invention is the provision of self-locking adjustment screws which are adapted to be associated with internally threaded members to establish a definite uniformly distributed locking relation therebetween and prevent unscrewing of one of the members with respect to the other under predetermined torque loads.

Other objects and advantages of the invention will appear from the following description taken in connection with the drawings, forming a part of the specification; and in which:

Fig. 1 is a side elevational view of a self-locking screw.

Fig. 2 is a side elevational view of the screw shown by Fig. 1 partly in section.

Fig. 3 is a side elevational view of a modified form of a self-locking screw.

Fig. 4 is a side elevational view of the screw shown by Fig. 3 partly in section.

Fig. 5 is a sectional view taken along lines 5—5 of Fig. 4.

Fig. 6 is a side elevational view of a further modified form of a self-locking screw.

Fig. 7 is a sectional view taken along lines 7—7 of Fig. 6, and

Fig. 8 is a fragmentary partly sectionalized view of the locking screw shown by Fig. 1 in assembled relation with an associated internally threaded member.

The present screw was devised in the interest of reducing the cost of self-locking adjustment screws so as to replace the conventional screw and lock nut both from an effective operating standpoint and cost of manufacture comparisons. Through the provision of a structure incorporating a diaphragm as a resilient intermediate member between a pair of axially spaced, equal pitch diameter, threaded sections it has become possible to provide a locking screw of effective holding characteristics and economical manufacture.

The diaphragm employed in the instant structures is in the form of a bellows of unbroken circumferential construction or relieved at a plurality of points in the circumference so as to provide greater resiliency depending upon the amount of resiliency that may be required in operational use of the screws.

Referring to the drawings for more specific details of the invention 10 represents generally a self-locking adjustment screw comprising a polygonal head portion 12, which has its upper end formed to provide a bearing surface adapted to be engaged by mechanism such as an engine poppet valve, not shown, and a shank 14.

The shank 14 of the screw includes a pair of axially aligned and disposed, equal pitch diameter, threaded sections 16 and 18 integrally connected by an unthreaded resilient section 20 concentrically arranged therewith. The lead of the thread on section 16 is axially offset to the lead of the thread on section 18 in the final construction of the screw by a negative amount as indicated by dotted lines A Fig. 1, the purpose of which will hereinafter appear. The shank of the screw is provided with a central bore 22 extending from the free extremity thereof through threaded section 18, section 20, and a portion of section 16 such that upon the completion of manufacture of the screw wherein the threaded sections are established axially offset to one another the resilient section 20 assumes the form of a substantially thin walled bellows or double diaphragm structure 24 so as to afford sufficient elastic deflection between the threaded sections.

The screw 10 is of the type intended for use wherein as shown by Fig. 1 the lead of the thread on section 18 is negatively axially offset to the lead of the thread on section 16, primarily where a compressive load is applied to the head end of the screw as in the case of a mechanical tappet for use in a poppet valve gear system. The threads on either side of the resilient section are mismatched in such a direction that the distance between the corresponding points of threads on each side is less than the whole number of times the thread leads and this dimension although predetermined for practical purposes is not critical as the torque characteristics of the screw are not governed thereby. When the screw is installed into a threaded section of constant pitch, such as a tappet 26, as shown by Fig. 8, the screw can be installed without difficulty until the first thread of the section 16 engages the female thread, at which time the resilient section 20 will deflect to accommodate the mismatch in the thread minus the axial thread clearance. This deflection is taken both elastically and through plastic yielding, wherein the plastic yielding accommodates variations in pitch diameter, thread form and mismatch, whereas the elasticity is substantially constant for all installations. The amount of torque required to rotate the screw when in engagement with an associated internally threaded member depends upon the amount of tension in the resilient section 20 and is controlled by the hardness of the screw and the thickness of the wall of the resilient section.

The screw 10 is made to provide the resilient section 20 by initially machining the shank 14 providing the axially disposed threaded sections 16 and 18 and reduced section 20 with a straight bore 22 therein having a diameter throughout equal to that of the bore in section 18 of the completed screw. The substantially thin walled section 18 is then swaged or rolled by appropriate tools, as shown by Figs. 1 and 2 of the drawings, to afford sufficient resiliency between the sections 16 and 18 as well as provide for the offsettting of the lead of the threads between said sections. With the completion of this operation the resilient section 20 takes the form of a double diaphragm or bellows of continuous unbroken annular construction and thus functions as a bellows or accordion thereby affording the necessary elastic return required in the screw 10.

Figs. 3, 4, and 5 illustrate a modification of the structures shown by Figs. 1 and 2 wherein the only difference therebetween exists in the resilient section interconnecting the threaded sections 16 and 18. The resilient section 120 of screw 100 shown by Figs. 3, 4 and 5 comprises a pair of radially disposed double diaphragm arms 122, said double diaphragm differing from that of Figs. 1 and 2 only in that through the removal of a portion of the annular surface of section 120 a greater resiliency is afforded over the section 20. The section 120 is formed in screw 100 similarly to section 20 of screw 10 in that the screw 10 is initially made with a reduced section corresponding to section 120 having a bore therethrough corresponding to the size of the bore through section 18 and then flats 124 are milled across the reduced section thereby relieving the annular reduced section and simultaneously reducing the stiffness of said section. After the milling of the flats the reduced section is swaged or otherwise properly worked to so collapse the section thus providing arms 122 of a double diaphragm construction thereby upsetting the previously constant lead between the threaded sections 16 and 18 effective to axially offset the lead of the thread on one of the sections to the lead of the thread on the other section.

Figs. 6 and 7 of the drawings illustrate a screw 200 which is a further modification of screws 10 and 100 solely relative to the resilient section thereof. Whereas the screws 10 and 100 respectively have a single unitary resilient section or pair of arms integrally connecting the threaded sections 16 and 18, the resilient section 220 of screw 200 comprises three double diaphragm arms 222 for the purpose of providing a degree of resiliency differing from the resilient sections 20 and 120. The screw 200 is formed similarly to the screws 10 and 100 especially to the relative machining thereof wherein the identical sections 16 and 18 are interconnected by a resilient section having a uniform bore extending through a portion of the shank 14 thereof. The screw 200 in its final form is provided with three arms of substantially double diaphragm construction having appropriate annular clearance therebetween permitting of axial deflection between the threaded sections when the screw is installed for use in a tappet or other similar structure having a constant lead threaded bore therein.

As shown by Fig. 7 the arms 222 are formed by pressing indentations 224 in the rolled sections 226 of the resilient section 220 and then by relieving said sections in an annular zone indicated by dotted lines B.

Fig. 8 illustrates the assembled relation of locking screw 10 in a member 26 such as a tappet body having a uniform continuous threaded bore 228 wherein the underside of the threads on section 16 bear uniformly axially upon the upperside of the threads 228 and the upperside of the threads on section 18 bear uniformly axially on the underside of threads 228 thereby affecting an efficient adjustable holding mechanism. With the locking screw 10 in adjusted position in member 226 the assembly is capable of withstanding normal operating conditions as predetermined without any change occurring in adjusted relation therebetween.

The screws 100 and 200 are likewise adaptable for use as screw 10 and as shown by the drawings are made relative to use primarily with tappets for use under compressive loads although many uses are obvious for a screw of a like construction as screws 100 and 200 having a positive lead offset between the sections 16 and 18 wherein screws of this nature are to be subjected to tensile loads.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. An integral self-locking screw comprising a shank having an axial bore throughout a portion of its length, an annular wall portion intermediate the length of said axially bored shank separating said bored shank into two axially spaced portions of like inside and outside diameter, said annular wall portion being substantially V-shaped in cross section and having external concave internal convex surfaces and characterized by longitudinal flexibility and resiliency, an external screw thread of like hand and equal pitch on each of said axially spaced shank portions, the helix of the thread on one of said shank portions being displaced axially with respect to the helix of the thread on the other of said shank portions.

2. An integral self-locking screw comprising a shank portion having an axial bore throughout a portion of its length, an annular wall portion of substantially uniform thickness around its circumference intermediate the length of said axially bored shank portion separating said bored shank portion into two axially spaced portions of like inside and outside diameter, said annular wall portion being substantially V-shaped in cross section and having external concave and internal convex surfaces and characterized by longitudinal flexibility and resiliency, an external screw thread of like hand and equal pitch on each of said axially spaced shank portions, the helix of the thread on one of said shank portions being displaced axially with respect to the helix of the thread on the other of said shank portions.

3. An integral self-locking screw comprising a shank having an axial bore throughout a portion of its length, an annular wall portion intermediate the length of said axially bored shank separating said bored shank into two axially spaced portions of like inside and outside diameter, said annular wall portion having an external concave surface extending inwardly beyond the wall of said bore and having an internal convex surface and characterized by longitudinal flexibility and resiliency, an external screw thread of like hand and equal pitch on each of said axially spaced shank portions, the helix of the thread on one of said shank portions being displaced axially with respect to the helix of the thread on the other of said shank portions.

4. A self-locking part comprising a member having a plurality of exteriorly threaded sections, the threading on said sections being off pitch one with respect to the other, and a hollow reduced section joining said threaded sections, said reduced section comprising a continuous spring member having concavo-convex walls, the concavity being on the exterior of said reduced section.

5. An integral self-locking screw comprising a shank portion having an axial bore throughout a portion of its length, a circumferentially concaved longitudinally flexible and resilient wall portion intermediate the length of said axially bored shank portion separating said shank into two axially spaced portions of like outside diameter, an external screw thread of like hand and equal pitch on each of said axially spaced portions, the helix of the thread on one of said portions being displaced axially with respect to the helix of the thread on the other of said portions.

6. An integral self-locking screw comprising a shank portion having an axial bore throughout a portion of its length, an annular wall portion of substantially uniform thickness intermediate the length of said axially bored shank portion separating said shank into two axially spaced portions of like outside diameter, said annular wall portion being externally concave and internally convex in longitudinal section and characterized by longitudinal flexibility and resiliency, an external screw thread of like hand and equal pitch on each of said axially spaced shank portions, the helix of the thread on one of said shank portions being displaced axially with respect to the helix of the thread on the other of said shank portions.

7. In a tappet screw, a tubular threaded shank, said shank between its ends having an annular groove extending around and dividing the shank into two sections connected by an annular rib of curved cross section, the threads on one threaded section having a contracted lead from the threads of the other section, said screw when threaded into a continuous threaded tappet body having said rib strained and the groove around said shank widened and its radius increased, whereby the threads of the shank and of the tappet body at one of each of the contracting sides thereof are pressed strongly together.

SIDNEY OLDBERG.
MICHAEL C. TURKISH.

References Cited in the file of this patent

UNITED STATES PATENTS

| Number | Name | Date |
|---|---|---|
| 2,166,686 | Hoern | July 18, 1939 |
| 2,196,637 | Luce | Apr. 9, 1940 |
| 2,224,659 | Stoll | Dec. 10, 1940 |
| 2,265,661 | Luce | Dec. 9, 1941 |
| 2,427,560 | Johnson | Sept. 16, 1947 |